April 9, 1946.  J. F. SKOLD  2,398,161
LIPSTICK SPREADER
Filed Sept. 22, 1941  2 Sheets-Sheet 2
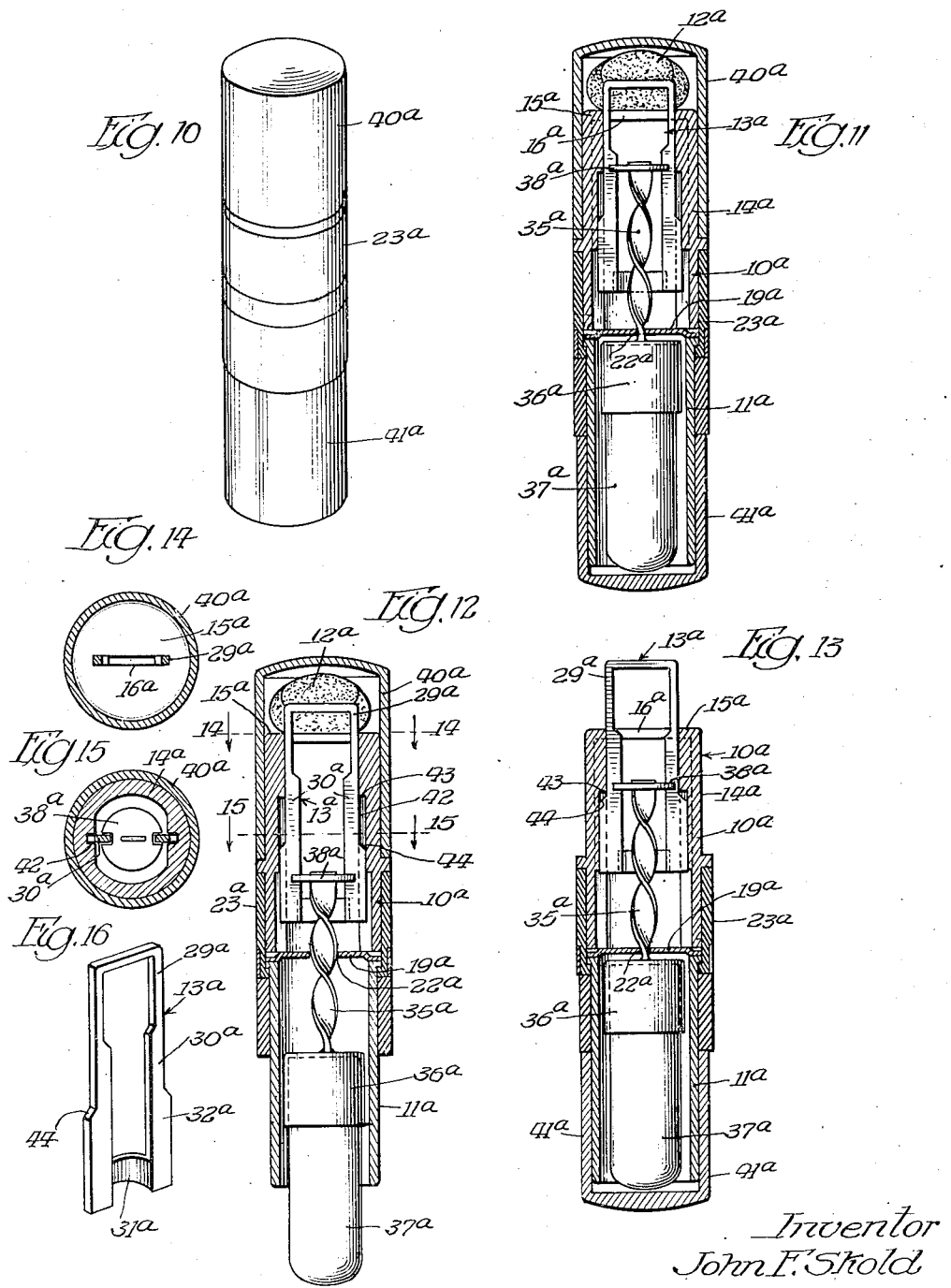
Inventor
John F. Skold
By Fred Gerlach
Atty.

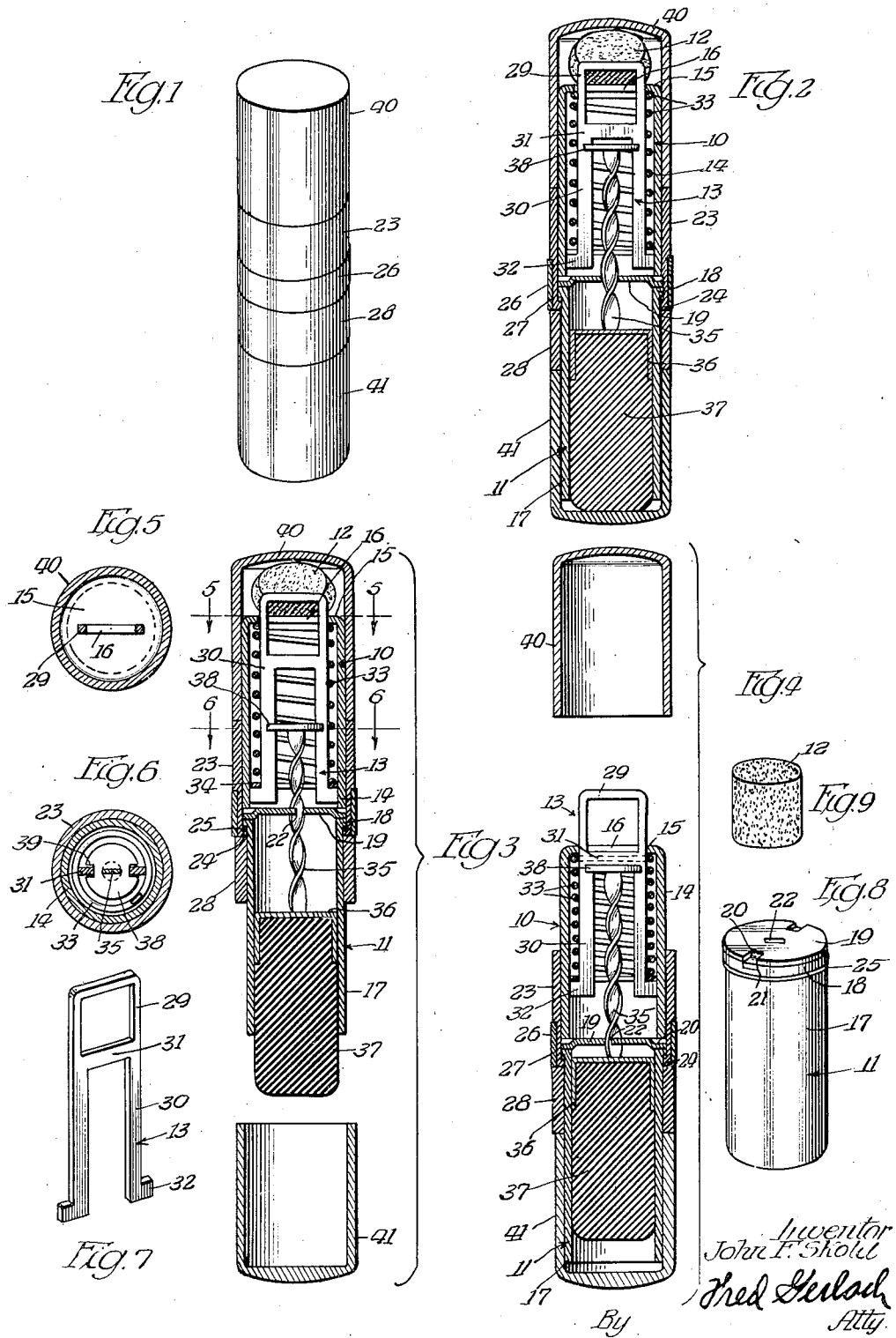

Patented Apr. 9, 1946

2,398,161

UNITED STATES PATENT OFFICE 2,398,161

LIPSTICK SPREADER

John F. Skold, Chicago, Ill., assignor to Charles E. Zimmerman, Chicago, Ill.

Application September 22, 1941, Serial No. 411,834

9 Claims. (Cl. 15—244)

The present invention relates generally to spreaders for lipstick and other cosmetics.

One object of the invention is to provide a lipstick spreader which is an improvement upon, and has certain advantages over, previously designed spreaders including that which is disclosed in and forms the subject matter of United States Patent No. 2,219,754, granted to me on October 29, 1940.

Another object of the invention is to provide a lipstick spreader which comprises a tubular body with a slotted cross-wall at one end thereof, a lipstick spreading wad of porous rubber latex or like compressible material fitting against the outer face of the cross-wall, and an elongated plate type wad retaining element which extends through, and is longitudinally slidable in, the slot in the cross-wall, has a wad encircling loop at its outer end, and is adapted in response to inward sliding movement to hold the wad in its operative position by causing a portion thereof to be compressed and clamped between the loop and the cross-wall and in response to outward sliding movement to release the wad for cleaning or replacement purposes.

Another object of the invention is to provide a lipstick spreader of the last mentioned character which also comprises an auxiliary tubular body which is aligned with and is rotatable relatively to the main tubular body and has its outer end open and its inner end provided with a fixed cross-wall in abutment with the inner or open end of the main tubular body, and in addition comprises a spring in the main tubular body for urging the wad retaining element inwards and an elongated screw type member which extends through an aperture in the central portion of the fixed cross-wall at the inner end of the auxiliary tubular body and is so arranged that in response to relative rotation of the two bodies it moves axially, and is further arranged so that in response to relative rotation of the two bodies in one direction it slides the wad retaining element outwards against the force of the spring and thus effects release of the lipstick spreading wad.

A further object of the invention is to provide a lipstick spreader of the type and character under consideration in which the elongated screw type member embodies at the end thereof within the auxiliary tubular body, a cup-shaped retainer for a lipstick piece and is adapted in response to axial displacement or shift thereof due to relative rotation of the two bodies to move the lipstick piece outwards into an exposed or operative position, or inwards into an inoperative position within the auxiliary body.

A still further object of the invention is to provide a lipstick spreader which effectively and efficiently fulfills its intended purpose and is characterized by the fact that it is compact and in addition embodies such a small number of parts that it may be produced at an extremely low cost.

Other objects of the invention and the various advantages and characteristics of the present lipstick spreader will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a perspective view of a lipstick spreader embodying one form of the invention;

Figure 2 is a longitudinal section showing the wad retaining element in its operative or wad retaining position and the lipstick piece in its retracted position wherein it is disposed for the most part within the auxiliary tubular body;

Figure 3 is a longitudinal section showing the spreader of Figures 1 and 2 after the two bodies have been so relatively rotated as to cause the lipstick piece to be shifted outwards by the screw type member;

Figure 4 is a longitudinal section showing the spreader after the bodies have been reversely rotated one relatively to the other in order to cause the screw type member to slide the wad retaining element into its inoperative position;

Figure 5 is a transverse section taken on the line 5—5 of Figure 3 and showing in elevation the slotted cross-wall at the outer end of the main tubular body;

Figure 6 is a transverse section on the line 6—6 of Figure 3;

Figure 7 is a perspective view of the wad retaining element;

Figure 8 is a perspective view of the auxiliary tubular body;

Figure 9 is a perspective view of the lipstick spreading wad; and

Figure 10 is a perspective view of a lipstick spreader embodying another or modified form of the invention;

Figure 11 is a longitudinal section of the spreader of Figure 10, showing the wad retaining element in its wad retaining position and the lipstick piece in its retracted position with the auxiliary tubular body;

Figure 12 is another longitudinal sectional view of the spreader in Figure 10, showing the auxiliary tubular body without its cap and the lipstick piece in its operative or projected position;

Figure 13 is a longitudinal section of the modified form of lipstick spreader, showing the main tubular body without its cap and the wad retaining element in its inoperative or wad releasing position;

Figures 14 and 15 are transverse sections taken respectively on the lines 14—14 and 15—15 of Figure 12; and Figure 16 is a perspective view of the wad retaining element of the modified form of spreader.

The spreader which is shown in Figures 1 to 9, inclusive, of the drawings constitutes one form or embodiment of the invention. It is primarily designed to spread lipstick and other cosmetics and comprises a main tubular body 10, an auxiliary tubular body 11, a lipstick spreading wad 12, and a wad retaining element 13.

The main tubular body 10 comprises a cylindrical side wall 14 and a circular or disk-like cross-wall 15. The cross-wall is at the outer end of the body 10 and is marginally united to the outer margin of the side wall 14. It has a diametric slot 16 and is preferably formed as an integral part of the side wall. The inner end of the main body 10 is open.

The auxiliary tubular body 11 is disposed in axial alignment with the main body 10 and comprises a cylindrical side wall 17. It is preferably formed of the same material as the main body and is connected to the latter for rotation relatively thereto as hereinafter described. The side wall 17 of the auxiliary body 11 is of slightly less external diameter than the main body 10 and embodies at its inner end an outwardly extending annular flange 18. A cross-wall 19 in the form of a metallic disk fits against the flanged inner end of the side wall 17 of the body 11 and forms a fixed part of said body. The marginal portion of the cross-wall 19 abuts against the flange 18 and has a pair of diametrically opposite downstruck lugs 20. These lugs fit within notches 21 in the inner end of the cylindrical side wall 17 and serve to hold the cross-wall 19 and the cylindrical side wall 17 in fixed relation. The margin of the cross-wall 19 abuts against and is rotatable relatively to the inner end of the side wall 14 of the main tubular body 10 and the central portion of said cross-wall embodies a slot 22 (see Figure 8). A sleeve 23 serves to hold the two tubular bodies against axial displacement while at the same time permitting them to rotate one relatively to the other. The sleeve 23 surrounds the inner end of the cylindrical side wall 14 of the body 10 and is fixedly secured to said inner end by way of a press fit. The inner end of the sleeve 23 projects beyond the open inner end of the body 10, surrounds the cross-wall 19 and the flange 18, and has an inturned flange 24 in lapped relation with said flange 18. A metallic ring 25 is interposed between the flanges 18 and 24 and serves as an anti-friction bearing for preventing the two bodies from sticking together especially when they are formed of plastic material. A metallic ring 26 for purposes of ornamentation is seated within an annular groove 27 in the inner end of the sleeve 23. In order to make the spreader as a whole symmetrical in appearance, a sleeve 28 is arranged in surrounding relation with the inner end of the cylindrical side wall 17 of the auxiliary body 11. This sleeve is connected in place by a press fit and abuts against the flange 24 and the ornamental ring 26. In assembling the spreader the cross-wall 19 is first placed against the flange 18 at the inner end of the cylindrical side wall 17 of the auxiliary body 11 so as to bring the lugs 20 thereof into interlocked relation with the notches 21. Thereafter the two bodies 10 and 11 are brought into axial alignment and are shifted together in order to bring the inner end of the side wall 14 of the main body 10 into abutment with the margin of the cross-wall 19. After properly arranging or positioning the two bodies the sleeve 23 is mounted on the side wall 17 of the body 11 and is urged inwards until the outer end thereof surrounds and is connected by a press fit to the inner end of the side wall 14 and the flange at the inner end thereof is in abutment with the metallic ring 28. At the conclusion of this operation the ring 28 is driven or pressed into place. When the two sleeves are in place they may be used by the user of the spreader as gripping means in connection with imparting relative rotation to the two bodies 10 and 11.

The lipstick spreading wad 12 is normally of cylindrical contour, as shown in Figure 9. It is adapted to fit against the outer face of the cross-wall 15 of the main body 10 and is formed of compressible material such for example as porous rubber latex. Preferably the wad is arranged in coaxial relation with the spreader body 10.

The element 13 serves as a medium for releasably securing the wad 12 in place. It is preferably in the form of an elongated metallic plate and extends through and is longitudinally slidable in the diametric slot 16 in the central portion of the cross-wall 15 at the outer end of the body 10. As best shown in Figure 7 of the drawings the element 13 comprises a loop 29, a pair of laterally spaced legs 30, and an intermediate cross-piece 31. The loop 29 is at the outer end of the element 13 and is shaped so as to surround the central portion of the wad 12. It is U-shaped and has the ends thereof in connected relation with the ends of the cross-piece 31. The legs 30 are at the inner end of the element 13 and like the ends of the loop 29 are connected or joined to the ends of the cross-piece 31. They are arranged in parallel relation and have outturned feet 32 at their inner extremities. When the loop 29 of the element 13 is in looped relation with the central portion of the wad 12 and the element is slid or shifted inwards relatively to the main tubular body 10 the wad is held in operative or lipstick spreading position and is firmly attached to the body 10 due to the fact that the central portion thereof is compressed or clamped between the outer end of the loop 29 and the slot defining portion of the cross-wall 15 at the outer end of the body 10. When the wad is in its operative position the side portions thereof, that is, the portions outwards of the compressed central portion, are caused to assume a hemispherical shape (see Figures 2 and 3). Release of the wad for cleaning or replacement purposes is effected by shifting the element 13 outwards. Outward shift of the element results in the loop 29 moving away from the cross-wall 15 and releasing the wad so that it may be shifted laterally out of engagement with the loop. A compression spring 33 serves to urge the element 13 inwards so that it holds the lipstick spreading wad 12 in its operative position. This spring is housed in the body 10 and surrounds the legs 30 of the element 13, as shown in Figures 2, 3, and 4. One end of the spring 33 abuts against the cross wall 15 at the outer end of the body 10 and the other or inner end of the spring is seated against a ring 34 which surrounds the outer extremities or ends of the legs 30 and abuts against the outwardly extending feet 32.

In addition to the parts heretofore described, the spreader comprises an elongated screw type member 35, a cup shaped holder 36, and a lipstick piece 37. The screw type member 35 is in the form of a twisted metallic strip. It extends through and fits snugly within the slot 22 in the cross wall 19, as shown in Figures 2, 3 and 4. A disk-like head 38 is fixed to the extremity of the end portion of the member 35 that is within the main tubular body 10. This head embodies a pair of diametrically opposite notches 39 in which the inner portions of the legs 30 of the wad retaining element 13 fit slidably. Because of the fact that the head 38 embodies the notches 39 the screw type member 35 is connected to rotate with the main body 10 while at the same time it is free to slide axially relatively to said body 10. By reason of the fact that the member 35 fits snugly within the slot 22 in the cross wall 19 the screw type member 35 is caused to move axially or longitudinally in connection with relative rotation of the two bodies 10 and 11. When the two bodies are turned or rotated in one direction one relatively to the other the screw type member 35 is shifted axially in one direction. When the elements are relatively rotated in the opposite direction the member 35 is displaced or shifted axially in the opposite direction. The cup shaped holder 36 is located in the auxiliary body 11 and is fixed to the extremity of the end portion of the screw type member 35, that is in said body 11. It is slidable relatively to the cylindrical side wall 17 of the body 11 and constitutes a support for the lipstick piece 37. When the two bodies 10 and 11 of the spreader are so relatively rotated that the screw type member 35 is downwardly displaced as viewed in the drawings, the head 38 moves away from the cross-piece 31 of the wad retaining element 13 and the holder 36 moves away from the cross-wall 19. Downward movement on the part of the holder 36 results in the lipstick piece 37 moving or sliding into an operative position wherein a portion thereof is exteriorly disposed with respect to the side wall 17 of the body 11 and is positioned for use. When the two tubular bodies 10 and 11 are reversely rotated one relatively to the other so as to effect upward displacement of the screw type member 35 the holder 36 and lipstick piece 37 are shifted upwards within the body 11 and the head 38 is brought into contacting relation with the cross-piece 31 of the element 13. The head 38 is so arranged that it engages the cross-piece 31 before the holder 36 reaches or approaches the cross-wall 19. Because of this arrangement it is possible by further upward shift of the member 35 in connection with continued reverse relative rotation of the bodies 10 and 11 to shift the element 13 upwards against the force of the spring into its inoperative position or wad releasing position (see Figure 4).

For the purpose of covering the outer ends of the two bodies 10 and 11 when the spreader is not in use two caps 40 and 41 are provided. The cap 40 serves as a temporary or removable enclosure for the lipstick spreading wad 12 and comprises a cylindrical side wall and an outer end wall. The side wall of the cap 40 fits around the outer end of the side wall 14 of the body 10 when the cap 40 is in its operative position. Such cap is removed merely by sliding it out of engagement with the body 10. The other cap, that is the cap 41, serves as a removable closure for the open end of the auxiliary body 11. It is the same in design and construction as the cap 40 and comprises a cylindrical side wall and an outer end wall. When the cap 41 is in its operative position the side wall thereof fits around the outer end of the cylindrical side wall 17 of the auxiliary body 11, as shown in Figures 2 and 4. The cap 41 is removed by sliding it away from or out of engagement with the body 11.

When the spreader is not in use, the parts thereof are arranged as shown in Figure 2 of the drawings. The particular arrangement contemplates the caps 40 and 41 being in their operative positions and the wad retaining element 13 and the lipstick holder 36 being in their retracted positions. When the user desires to apply a lipstick the cap 41 is first removed. Thereafter the two tubular bodies 10 and 11 are turned, one relatively to the other so as to cause the lipstick holder 36 to move away from the crosswall 19 and thus move the lipstick piece 37 into its exposed or operative position. After use of the lipstick piece 37 the two bodies are reversely turned one relatively to the other until the screw type member 35 has been shifted upwards a sufficient distance to bring the lipstick piece 37 within the confines of the cylindrical side wall 17 of the body 11. After this operation the cap 41 is slid back into place. If the user desires to spread the lipstick the cap 40 is removed and the wad 12 by proper manipulation of the spreader as a whole is moved over the lips in order to distribute the applied lipstick in the proper or desired manner. After use of the wad 12 the cap 40 is returned to its operative position. In the event that it is desired to replace the wad 12 due to undue soiling thereof the cap 40 is removed and the two tubular bodies 10 and 11 are so turned one relatively to the other as to shift the screw type member 35 upwards to the fullest possible extent. This operation results in outward shift of the wad retaining element 13 and release of the wad. When the loop 29 of the element 13 is in an extended position, as shown in Figure 4, due to raising of the element 13, the wad 12 may be removed from under it. After removal of the wad 12 a new wad is shifted under the loop 29. Thereafter the two bodies 10 and 11 are so rotated as to effect a preliminary downward shift of the screw type member 35 and resultant inward movement of the head 38. During inward movement of the head the element 13 is shifted inwards into its wad holding position due to the action of the compression spring 33 within the cylindrical side wall 14 of the main tubular body 10.

The aforementioned lipstick spreader may be manufactured at a low and reasonable cost due to the simplicity of the design thereof and the fact that it consists of but a comparatively small number of parts. It is compact and effectively and efficiently fulfills its intended purpose. Due to the fact that the spreader has the lipstick piece 37 associated with it, the article as a whole may be used to apply lipstick as well as to spread the applied lipstick.

The spreader which is shown in Figures 10 to 16, inclusive of the drawings, constitutes a modified or second embodiment of the invention and serves the same purpose as the spreader of Figures 1 to 9, inclusive and in general is the same as the last mentioned spreader except for the arrangement and design of the wad retaining element. In general the modified form of spreader comprises a main tubular body 10a, an auxiliary tubular body 11a, a lipstick spreading wad 12a and a wad retaining element 13a.

The main tubular body 10a is substantially like the body 10 of the first described lipstick spreader and comprises a cylindrical side wall 14a and a circular cross wall 15a at the outer end of the side wall. The latter is formed integrally with the outer end of the side wall 14ᵃ and embodies a diametric slot 16ᵃ.

The auxiliary tubular body 11ᵃ is exactly the same in design and construction as the auxiliary tubular body 11 and has a lug equipped cross wall 19ᵃ at its inner end. This cross wall is in interlocked relation with the inner end of the auxiliary body 11ᵃ and has a slot 22ᵃ in its central portion. A sleeve 23ᵃ serves to hold the two tubular bodies 10ᵃ and 11ᵃ in connected relation while at the same time it permits them to rotate one relatively to the other.

The lipstick spreading wad 12ᵃ fits against the outer face of the cross wall 15ᵃ of the main tubular body 10ᵃ and is releasably held in place by means of the element 13ᵃ as described hereafter.

The element 13ᵃ is in the form of a metal stamping and extends through, and is slidably mounted in, the slot 16ᵃ in the cross wall 15ᵃ. It serves the same purpose as the wad retaining element 13 of the lipstick spreader of Figures 1 to 9, inclusive, and comprises a loop 29ᵃ and a pair of laterally spaced legs 30ᵃ. The loop 29ᵃ is at the outer end of the element 13ᵃ and is adapted to surround the central portion of the wad 12ᵃ. The legs 30ᵃ are at the inner end of the element and are in the nature of continuations of the side pieces or parts of the loop 29ᵃ. They are arranged in parallel relation and have longitudinally elongated outwardly extending feet 32ᵃ. The latter, as shown in Figures 11, 12, 13 and 15, fit slidably in a pair of diametrically opposite longitudinally extending inwardly facing grooves 42 in the side wall 14ᵃ of the main tubular body 10ᵃ. In addition to the loop 29ᵃ and the legs 30ᵃ the wad retaining element 13ᵃ comprises an arcuate cross piece 31ᵃ. This piece is formed integrally with, and extends between, the inner or lower ends of the legs 30ᵃ and serves to urge the legs outwards in such manner that the feet 32ᵃ grip frictionally the groove defining portions of the side wall 14ᵃ. When the loop 29ᵃ is in looped relation with the central portion of the wad 12ᵃ and the element is slid or shifted inwards relatively to the main tubular body 10ᵃ the wad is held in its operative or lipstick spreading position and is firmly attached to the body 10ᵃ due to the fact that the central portion thereof is compressed or clamped between the outer end of the loop 29ᵃ and the slot defining portion of the cross wall 15ᵃ. The frictional grip between the feet 32ᵃ and the groove defining portions of the side wall 14ᵃ serves to hold the element in its operative or wad retaining position. When it is desired to release the wad it is only necessary to grip the loop 29ᵃ and shift the element outwards into its inoperative or wad releasing position. The cross piece 31ᵃ urges the legs 30ᵃ apart with a spring action and hence the desired frictional grip between the feet of the element and the aforementioned groove defining portions of the side wall 14ᵃ is always maintained. The side wall 14ᵃ is provided with shoulders 43 at the outer ends of the grooves 42 and the feet 32ᵃ embody shoulders 44 at their upper ends. The shoulders 43 and 44 coact to limit or restrict outward sliding movement of the element 13ᵃ with respect to the main tubular body 10ᵃ. The element 13ᵃ differs from the wad retaining element 13 of the lipstick spreader of Figures 1 to 9, inclusive, in that it is retained in place by friction and there is no spring for urging it inwards. It further differs from the element 13 in that it has no intermediate cross piece 31 and relies upon manual manipulation for shift thereof into its inoperative or wad releasing position.

In addition to the hereinbefore described parts the spreader of Figures 10 to 16, inclusive, comprises a screw type member 35ᵃ, a cup shaped holder 36ᵃ and a lipstick piece 37ᵃ. The screw type member 35ᵃ extends through the slot 22ᵃ in the cross wall 19ᵃ and functions the same as the screw type member 35. A disc-like head 38ᵃ is fixedly connected to the end of the member 35ᵃ that is within the main tubular body 10ᵃ and this head is provided with a pair of diametrically opposite notches in which the inner portions of the legs 30ᵃ fit slidably. The cup-shaped holder 36ᵃ is fixedly secured to the other end of the screw type member 35ᵃ and serves as a retainer for the lipstick piece 37ᵃ. The head 38ᵃ and the screw type member 35ᵃ function in the same manner as the head 38 and the member 35 of the first described lipstick spreader. When the two bodies 10ᵃ and 11ᵃ are rotated in one direction one relatively to the other the lipstick piece 37ᵃ is caused to project from the body 11ᵃ, as shown in Figure 12, and when the two bodies are reversely rotated one relatively to the other the lipstick piece and the holder therefor are retracted, as illustrated in Figure 11. The main tubular body 10ᵃ is provided with a removable cap 40ᵃ for covering the wad 12ᵃ when the latter is not in use and the auxiliary tubular body 11ᵃ is provided with a removable cup-shaped cap 41ᵃ for covering the lipstick piece 37ᵃ when the latter is in its retracted position.

The invention is not to be understood as restricted to the details set forth, since these may be modified within the scope of the appended claims, without departing from the spirit and scope of the invention.

Having thus described the invention what I claim as new and desire to secure by Letters Patent is:

1. As a new article of manufacture, a spreader adapted for use in spreading lipstick or like material and comprising a tubular body having at one end thereof a fixed cross wall with a slot therein, a compressible lipstick spreading wad against the outer face of said cross wall, and an elongated wad retaining element formed of a flat sheet metal stamping extending through, and slidably mounted in, the slot, provided at its outer end with a wad encircling loop and at its inner end with a pair of longitudinally extending, laterally spaced legs with outwardly extending feet, and adapted when slid in one direction to cause a portion of the wad to be compressed between the loop and said cross wall and when slid in the opposite direction to release the wad for removal from the cross wall.

2. As a new article of manufacture, a spreader adapted for use in spreading lipstick or like material and comprising a hollow body having at one end thereof a fixed cross wall with a slot therein, a compressible lipstick spreading wad against the outer face of said cross wall, an elongated wad retaining element extending through, and slidably mounted in, the slot, provided at its outer end with a wad encircling loop, and adapted when slid in one direction to cause a portion of the wad to be compressed between the loop and said cross wall and when slid in the opposite direction to release the wad for removal from the wall, and a helical spring disposed within the body and applied to the inner end of the element for urging the element in said one direction.

3. As a new article of manufacture, a spreader adapted for use in spreading lipstick or like material and comprising a hollow body having a wall with a slot therein, a compressible lipstick spreading wad against the outer face of said wall, an elongated wad retaining element extending through, and slidably mounted in, the slot, provided at its outer end with a wad encircling loop and adapted when slid in one direction to cause a portion of the wad to be compressed between the loop and said wall and when slid in the opposite direction to release the wad for removal from the wall, a spring disposed within the body and applied to the inner end of the element for urging the element in said one direction, and means associated with the body for positively sliding the element in said other direction against the force of the spring.

4. As a new article of manufacture, a spreader adapted for use in spreading lipstick or like material and comprising a tubular body having a fixed slotted cross wall at one end thereof and a rotatable cross wall at its other end, a compressible lipstick spreading wad against the outer face of said fixed slotted cross wall, an elongated wad retaining element extending through, and slidably mounted in, the slot, provided at its outer end with a wad encircling loop and adapted when slid inwards to cause a portion of the wad to be compressed between the loop and the slotted cross wall and when slid outwards to release the wad for removal from said slotted cross wall, and means operative in response to rotation of the rotatable cross wall in one direction relatively to the body positively to slide the element outwards.

5. As a new article of manufacture, a spreader adapted for use in spreading lipstick or like material and comprising a tubular body having a fixed slotted cross wall at one end thereof and a rotatable cross wall at its other end, a compressible lipstick spreading wad against the outer face of said fixed slotted cross wall, an elongated wad retaining element extending through, and slidably mounted in, the slot, provided at its outer end with a wad encircling loop and adapted when slid inwards to cause a portion of the wad to be compressed between the loop and the slotted cross wall and when slid outwards to release the wad for removal from said slotted cross wall, a spring disposed in the body and applied to one end of the element so that it urges said element inwards, and means operative in response to rotation of the rotatable cross wall in one direction relatively to the body positively to slide the element outwards.

6. As a new article of manufacture, a spreader adapted for use in spreading lipstick or like material and comprising a tubular body having a fixed slotted cross wall at one end thereof and a rotatable cross wall at its other end, a compressible lipstick spreading wad against the outer face of said fixed slotted cross wall, an elongated wad retaining element extending through, and slidably mounted in, the slot, provided at its outer end with a wad encircling loop and adapted when slid inwards to cause a portion of the wad to be compressed between the loop and the slotted cross wall and when slid outwards to release the wad for removal from said slotted cross wall, a compression spring in the body extending between the slotted cross wall and the inner end of the element and arranged to urge the elements inwards into its wad compressing position, and means including a screw type member controlled by the rotatable cross wall and adapted in response to rotation of said last mentioned cross wall relatively to the body positively to slide the element outwards against the force of the spring.

7. As a new article of manufacture, a spreader adapted for use in spreading lipstick or like material, and comprising a hollow body in the form of a tubular side wall and a cross wall at one end of the side wall and with a slot therein, a compressible lipstick spreading wad against the outer face of said cross wall, an elongated wad retaining element extending through, and slidably mounted in, the slot, provided at its outer end with a wad encircling loop and its inner end with a pair of oppositely disposed legs adjacent the inner face of the side wall, and adapted to be slid back and forth between an operative position wherein the loop clamps a portion of the wad against the cross wall and an inoperative position wherein the loop releases the wad for removal from said cross wall, and spring means between the legs for urging the latter outwards into frictional engagement with the side wall of the body and causing them to retain the element in its operative and inoperative positions.

8. A spreader of the character described comprising a hollow body having a tubular side wall with opposed longitudinal grooves therein and in addition a cross wall at one end of the side wall and with a slot therein, a wad for spreading purposes fitting against the outer face of the cross wall, and an elongated wad retaining element extending through, and slidably mounted in, the slot, provided at the outer end with a wad encircling loop and at its inner end a pair of opposed legs fitting slidably within the grooves respectively, adapted when slid inwards to assume an operative position wherein the loop compresses a portion of the wad against the cross wall and when slid outwards to assume an inoperative position wherein the wad is released for removal from the cross wall, and spring means extending between the inner ends of the legs and serving to urge said legs outwards into operative engagement with the groove defining portions of the side wall so that they in turn serve to retain the element in its operative and inoperative positions.

9. A spreader of the character described comprising a hollow body having a tubular side wall with opposed longitudinal grooves therein and in addition a cross wall at one end of the side wall and with a slot therein, a wad for spreading purposes fitting against the outer face of the cross wall, and an elongated wad retaining element extending through, and slidably mounted in, the slot, provided at the outer end with a wad encircling loop and at its inner end a pair of opposed legs fitting slidably within the grooves respectively, adapted when slid inwards to assume an operative position wherein the loop compresses a portion of the wad against the cross wall and when slid outwards to assume an inoperative position wherein the wad is released for removal from the cross wall, and coacting stop shoulders between the legs and the side wall of the body for limiting outward sliding movement of the element.

JOHN F. SKOLD.